United States Patent [19]

Jacobs et al.

[11] Patent Number: 5,734,540
[45] Date of Patent: Mar. 31, 1998

[54] TAPE REEL AND CARTRIDGE HAVING PROTECTIVE FLANGE RINGS

[75] Inventors: Lynn Curtis Jacobs, Berthoud; Donovan Milo Janssen, Boulder, both of Colo.

[73] Assignee: Storage Technology Corporation, Louisville, Colo.

[21] Appl. No.: 906,132

[22] Filed: Aug. 5, 1997

Related U.S. Application Data

[63] Continuation of Ser. No. 689,841, Aug. 14, 1996, abandoned.

[51] Int. Cl.[6] .................................................. G11B 23/107
[52] U.S. Cl. ............................................................ 360/132
[58] Field of Search ............................. 360/132; 242/341, 242/345, 345.2, 345.3, 346, 347, 348

[56] References Cited

U.S. PATENT DOCUMENTS 3,768,753  10/1973  Catto et al. ............................... 242/348
4,916,566   4/1990  Urayama .................................. 242/345

*Primary Examiner*—Robert S. Tupper
*Attorney, Agent, or Firm*—Duft, Graziano & Forest

[57] ABSTRACT

A tape cartridge and reel for storing magnetic tape wound on the reel such that damage to the edges of the magnetic tape is significantly reduced. A protective ring is formed in the reel or in the tape cartridge such that shock-induced energy is transmitted through a defined path. Transmission of the shock-induced energy through the defined path is effective to avoid the compression of the flanges of the reel so that the edges of the magnetic tape are not folded, wrinkled, or otherwise damaged.

6 Claims, 3 Drawing Sheets

TAPE REEL AND CARTRIDGE HAVING PROTECTIVE FLANGE RINGS

This application is a file wrapper continuation of application Ser. No. 08/689,841, filed Aug. 14, 1996 now abandoned.

FIELD OF THE INVENTION

This invention relates to the field of magnetic tape storage cartridges which include a rotatably mounted reel on which is wound a magnetic tape media. In particular, the invention relates to a tape storage cartridge having a reel on which the magnetic tape media is protected from physical damage.

PROBLEM

Magnetic tape is a common medium for the storage of data to be utilized by a computer. Magnetic tape has found widespread use as a data storage medium because it provides a relatively inexpensive solution for storing large amounts of data. There are, however, some problems with the methods previously used to store magnetic tape that can cause damage to the magnetic tape media. This damage results in errors when reading or recording data on the magnetic tape.

Magnetic tape is stored on cartridges of which there are a variety of different types and sizes. One reason for the variety of cartridge types is the variety of different tape drives in which the cartridges are used. Tape cartridges are comprised essentially of a cartridge shell within which is a rotatably mounted reel. Magnetic tape is wound around the hub of the reel. Reel flanges are used to contain the magnetic tape as the magnetic tape is wound on the hub. A fully loaded tape cartridge has magnetic tape wound around the hub such that the multiple layers of tape form a stack of magnetic tape extending out to near the end of the reel flanges.

The tape cartridge is inserted into a tape drive mechanism which automatically threads the magnetic tape from the tape cartridge through the tape guide mechanism of the tape drive assembly. The tape is then available to the tape drive mechanism for the reading and writing of data.

Data is recorded on magnetic tape in a specific format. The ability of a tape drive mechanism to read data from a piece of magnetic tape is contingent upon the data existing on the tape at positions according to the specific recording format. If a read head is aligned with a segment of magnetic tape in order to read a certain data track but instead a different data track is adjacent the read head, errors in reading the data occur.

One way to ensure that the magnetic tape medium is properly aligned with the read/write heads of the tape drive mechanism is to use the edge of the magnetic tape medium as a reference position. If, for example, a tape cartridge is loaded with ½" magnetic tape, a tape edge guide mechanism in the tape drive is used whereby one edge of the magnetic tape is kept flush against the tape edge guide. If the width of the tape is constant, ½" in this example, then each track on the magnetic tape is in a known location, according to the recording format of the tape, relative to the read and write heads of the tape drive.

If the edge of a segment of magnetic tape is not straight, the tape edge guide mechanism is not able to properly align the magnetic tape. This can occur when the magnetic tape has been somehow damaged causing a crease, wrinkle, or other deformity, in the edge of the tape. When the damaged portion of the magnetic tape moves along the tape guide, the position of the magnetic tape with respect to the read and write heads is incorrect and, to some extent, unknown. Errors can then result when reading data from the tape. Typical tape drive devices include a control unit programmed in such a way, through error correction routines, to detect when errors of this type occur. However, even if the error is detectable, there may be no way to read certain data from a damaged tape. These errors are sometimes called permanent errors and can be critical depending on the extent and type of data that is lost.

It is therefore important that tape loaded in a tape cartridge remain undamaged. Tape cartridges are subject to various forms of physical stress and shock. Magnetic tape is often used for long term storage of data for periods of many years therefore the cartridge must protect the tape not just when the cartridge is new but also after many years of physical handling.

Magnetic tape stored in prior art tape cartridges is susceptible to damage when the tape cartridge suffers a physical shock, such as when it is dropped. As described above, magnetic tape is wound on the hub of a reel. The reels have flanges extending from the hub which are flared slightly so that the distance between the flanges is greater at the outer edge of the flanges than the distance between the flanges immediately adjacent the hub. This is because allowance must be made for air to escape from between the layers of tape as the tape is wound on the hub.

It is also necessary to provide an amount of clearance between the reel and the cartridge shell so that the reel can move, to a limited extent, independent of the position of the shell. This clearance is required to allow the reel to be engaged by the motor drive of the tape drive mechanism when the cartridge is inserted into the tape drive mechanism.

Sometimes when the tape is winding on the hub, a layer of tape is wound offset from the rest of the stack of tape wound on the hub. This results in what is termed a "pop strand" or "stagger wrap fin" which is a single layer, or maybe a grouping of layers, which are not edge for edge aligned with the remainder of the tape wound on the hub. The stagger wrap fin extends into the space between the edge of the stack of tape and the adjacent flange. If the cartridge is dropped on the floor and lands on a corner of the cartridge, the shock of the impact can force the outer edge of the reel flange to contact the cartridge shell. This causes the outer edge of the reel flange to be forced towards the other reel flange thereby reducing the distance between the reel flanges. In this event, a stagger wrap fin can be pinched between the reel flange and the stack of tape. When a stagger wrap fin gets pinched between the reel flange and the stack of tape, a crease is formed in the tape comprising the stagger wrap fin. Creases in the tape edges destroy the straight, consistent tape edge necessary for error-free operation of the tape drive mechanism.

If the edge of the tape is damaged, then the tape does not thread properly in the tape drive mechanism. When the damaged tape edge passes along the tape edge guide mechanism, the tape is improperly aligned relative to the read and write heads of the tape drive device. This results in errors when reading data from the tape or writing data to the tape. These errors may be, as described above, permanent errors which cannot be corrected through error correction codes. Permanent errors can be catastrophic depending on the criticality of the data that is lost.

There exists a need for tape a cartridge that better protects the magnetic tape wound on the cartridge. In particular, there exists a need for a tape cartridge that is less susceptible to damaging the edge of a magnetic tape wound on the cartridge.

SOLUTION

The present invention solves the above identified problems and others, thereby advancing the state of the useful arts, by providing apparatus and methods for tape cartridges that more reliably protect the magnetic tape wound on the tape cartridge. In particular, this invention provides a tape cartridge in which protective rings are added to the cartridge shell or the reel in order to keep the reel flanges from striking the cartridge shell in response to a physical shock. In this way, tape stored on a tape cartridge of the present invention is not susceptible to edge damage when the tape cartridge is subject to physical shock. The tape cartridge of the present invention ensures that data is not lost due to tape edge damage.

A ring of material is added to each side of the reel hub, concentric with the reel hub, to reduce the clearance between the reel hub and the shell. The clearance between the reel flanges and the shell is not effected by the addition of the protective rings. If the tape cartridge is subject to an impact, the protective rings strike the cartridge shell before the outer ends of the reel flanges. Therefore, no force is exerted on the outer ends of the reel flanges and there is no contact between the reel flanges and any stagger wrap fins of the magnetic tape. The result is that the edges of the magnetic tape are not damaged by an impact to the tape cartridge.

An alternative solution is to locate the protective rings on the cartridge shell as opposed to the reel hub. The same reduction in clearance between the reel hub and cartridge shell is achieved. The choice between the two approaches is one of cost and ease of assembly.

The protective rings of the present invention allow for the necessary movement between the reel and the cartridge shell to facilitate connection between the tape cartridge and tape motor drive. The protective rings, however, ensure that the ends of the reel flanges can not contact the cartridge shell, even when the tape cartridge is subject to the physical shock of an impact.

The present invention provides a relatively low cost solution to the problem of the damaging of magnetic tape edges in a tape cartridge. The tape cartridge of the present invention maintains full functionality as regards operation and connectivity with the tape motor drive of a tape drive mechanism but ensures that magnetic tape wound on the tape cartridge is not damaged due to physical impacts.

Other salient features, objects, and advantages are apparent to those skilled in the art upon a reading of the discussion below in combination with the accompanying drawings.

DETAILED DESCRIPTION

Description of Tape Cartridge and Tape Guide Mechanism

Figure 3:
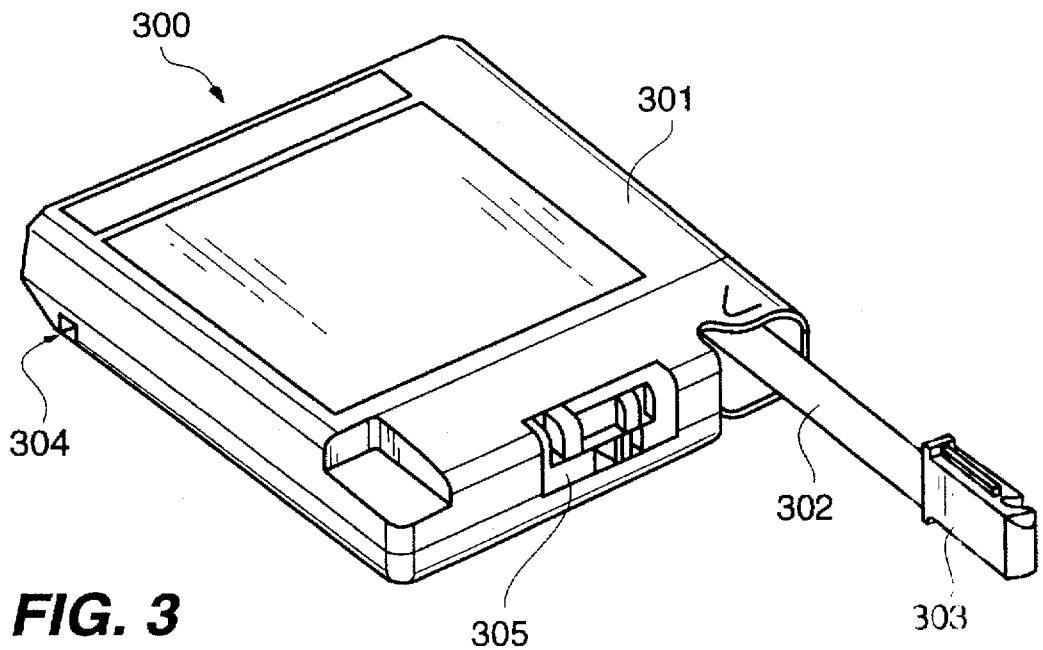
FIG. 3 shows a complete tape cartridge.

FIG. 3 depicts a tape cartridge 300 of the type that is the subject of the present invention. Tape cartridge 300 is comprised of cartridge shell 301 which encases a reel (not shown in FIG. 3) around which is wound magnetic tape 302. Leader block 303 is attached to the end of the length of magnetic tape 302 contained inside shell 301 and is formed to cooperate with the tape drive mechanism (not shown) to allow the automatic threading of magnetic tape 302 in the tape drive mechanism. Leader block 303 and attached magnetic tape 302 are shown slightly extended from shell 301 in FIG. 3. There are various features on shell 301, such as locating notch 304 and write-inhibiting switch 305, which are not relevant to the present invention. It is apparent to those skilled in the art that tape cartridge 300 is only exemplary and the present invention is applicable to any configuration of tape cartridge 300.

Figure 1:
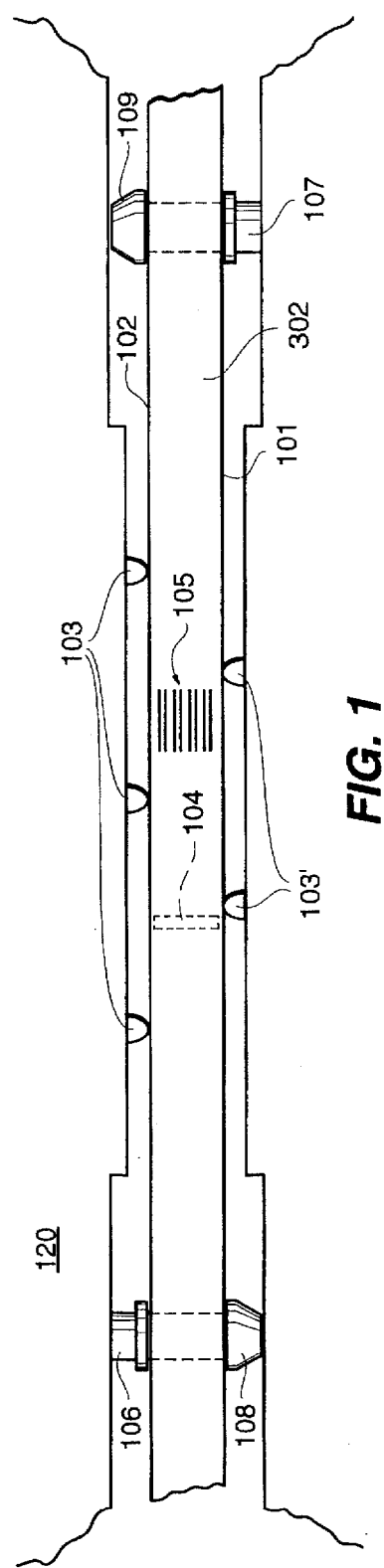
FIG. 1 depicts a simplified view of a tape edge guide mechanism and a segment of undamaged magnetic tape.

FIG. 1 is a schematic representation of a tape edge guide 100. Tape edge guide 100, part of a tape drive mechanism (not shown), operates to properly position tape 302 within the tape drive mechanism. Edge 101 of magnetic tape 302 is held against guide element 110 by guide pins 103. Guide pins 103 are spring loaded and positioned to exert a force on edge 102 of tape 100. The spring element (not shown) in guide pins 103 exert a force against edge 102 of magnetic tape 302 such that edge 101 of magnetic tape 302 remains flush against guide element 110. In this fashion, the position of tape 100 between guide element 110 and guide pins 103 is controlled. Data tracks 105 are recorded on, and read from, the surface of magnetic tape 302 by read/write element 104. Read/write element 104 is composed of an array of read/write heads. There is at least one read/write head pair associated with each of data tracks 105.

The control of the position of magnetic tape 302 between guide element 110 and guide pins 103 is important to the proper interaction between magnetic tape 302 and read/write element 104. In order that each of the read/write heads on read/write element 104 reads and writes both in the proper track, each of tracks 105 must be a certain predetermined distance from guide element 110. In FIG. 1, magnetic tape 302 is undamaged. As magnetic tape 302 is moved past read/write element 104, the variation in position of an individual track 105 with respect to read/write element 104 is controlled to within the variation in width of magnetic tape 302. Therefore, each data track 105 is properly aligned with its corresponding read/write head pair on read/write element 104. Data, in the example of FIG. 1, is written to magnetic tape 302 and read from magnet tape 302 without errors.

Figure 2:
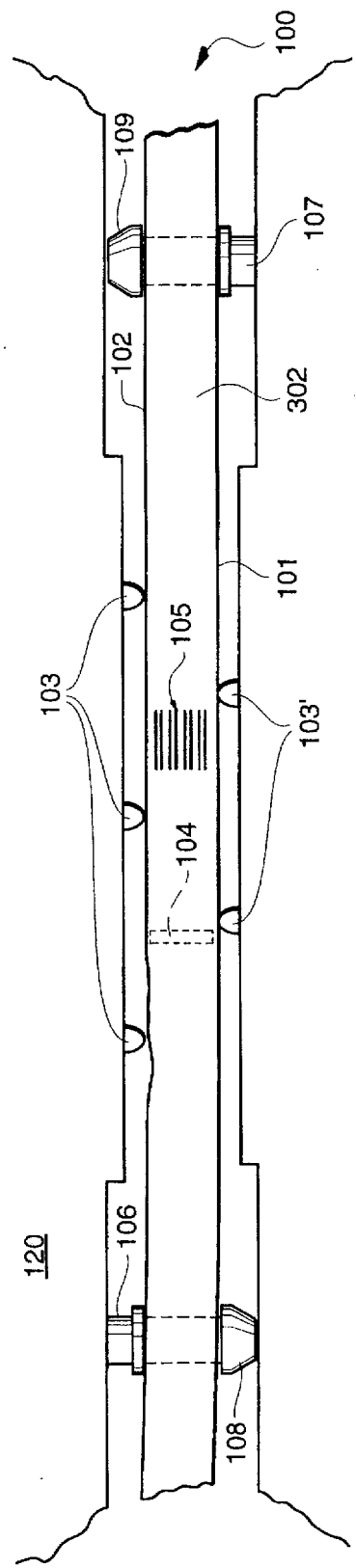
FIG. 2 depicts a simplified view of a tape edge guide mechanism and a segment of damaged magnetic tape.

FIG. 2 depicts the same section of tape guide 110. However, a section of magnetic tape 302 having damaged edges is passing along tape guide 110. Section 200 of magnetic tape 302 has been damaged by creasing and is no longer straight. Therefore, as section 200 passes by each of guide pins 103, magnetic tape 302 is allowed to drift away from guide element 110, as shown in FIG. 2, because guide spring 103 is not exerting pressure on magnetic tape 302 to hold it against guide element 110. The result is that individual data tracks 105 change position with respect to read/write element 104 causing errors in the reading and writing of data on magnetic tape 302.

Description of Prior Art Tape Cartridge

Figure 4:
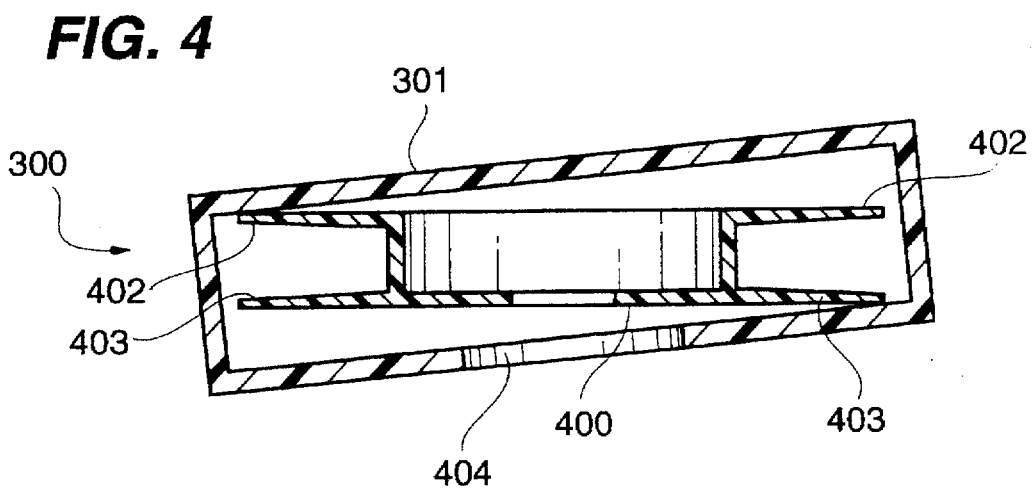
FIG. 4 shows a schematic view of a reel within a tape cartridge of the prior art.

FIG. 4 shows a schematic representation of a cut-away view of a tape cartridge 300 of the prior art. Reel 400 is contained within shell 301 and, when engaged by a drive motor mechanism (not shown) of the tape drive mechanism as described below, spins within shell 301 in response to the operation of the drive motor. Reel 400 is comprised of annular-shaped hub 401 and flanges 402 and 403. Flanges 402 and 403 extend radially outward from hub 401 forming a channel between them in which tape 302 is contained as tape 302 is wound around hub 401. Each of flanges 402 and 403 have a proximal end at the connection point between each flange and hub 401. Each of flanges 402 and 403 have a distal end at the end of the flange radially extended from hub 401. In FIG. 4, reel 401 is depicted without any tape 302 wound around hub 401.

The drive motor mechanism extends through drive motor port 404 in shell 301 and engages reel 400 through hub 401. In response to signals from the tape drive mechanism, the drive motor mechanism rotates reel 400. The operation of the drive motor mechanism is coordinated with the remainder of the tape drive mechanism to draw tape 302 from tape cartridge 300 for use in the tape drive mechanism for reading and/or writing of data. To allow for tolerances in the size and shape of different tape cartridges 300 and for tolerances in the placement of different tape cartridges 300 with respect to the drive motor mechanism, there must be a certain amount of clearance between reel 400 and shell 301. This is necessary to allow reel 400 to move slightly with respect to shell 301 to allow proper engagement between reel 400 and the drive motor mechanism. For example, in a tape cartridge 300 of the prior art, the maximum clearance between flanges 402 or 403 and shell 301 is approximately 0.185" and the minimum clearance between flanges 402 or 403 and shell 301 is 0.0".

In FIG. 4, reel 401 is depicted at an angle within shell 301. This is representative of the degree of movement of reel 400 within shell 301 that is possible in tape cartridges 300 of the prior art. At a first side of reel 400, flange 402 is contacting shell 301 while flange 403 is approximately 0.185" from shell 301. At a second side of reel 400, flange 403 is contacting shell 301 and flange 402 is approximately 0.185" from shell 301. When tape cartridge 300 is subject to a physical shock, such as when tape cartridge 300 is inadvertently dropped to the floor, the force of the contact between tape shell 301 and the floor is transferred to the distal ends of flanges 402 and 403 at the points flanges 402 and 403 contact shell 301. This force causes the distal ends of flanges 402 and 403 to be forced together, decreasing the distance between the distal ends of flanges 402 and 403. This condition causes damage to the edges of tape 302 because flanges 402 and 403 contact the edges of tape 302, as described with respect to FIG. 5.

Figure 5:
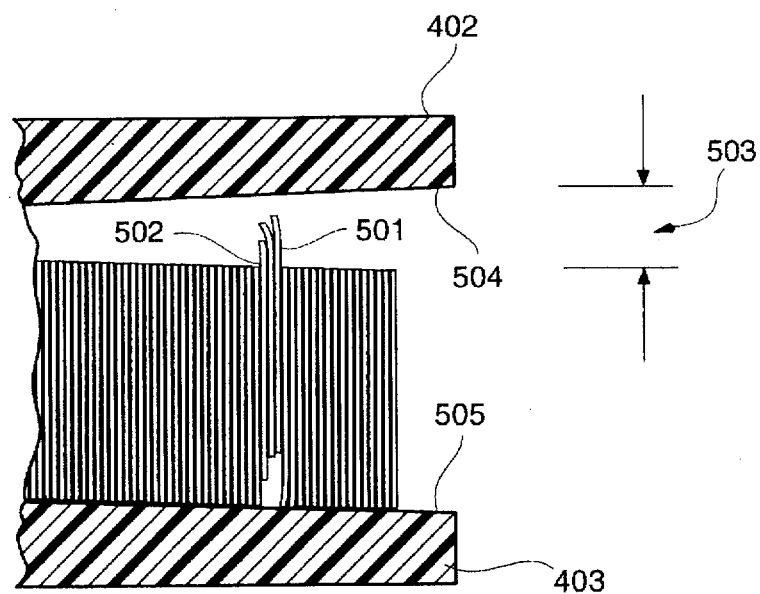
FIG. 5 shows a cutaway schematic view of magnetic tape held within the reel flanges.

FIG. 5 is a more detailed section view of the distal ends of flanges 402 and 403 showing a section through the windings of tape 302. The distance between flanges 402 and 403 is smallest at the proximal ends of flanges 402 and 403, next to hub 401. Side 504 of flange 402 and side 505 of flange 403 are angled such that the distance between flange 402 and flange 403 increases as one moves outward toward the distal ends of flanges 402 and 403. This is a necessary feature of reel 400 because of the need to allow air to escape from between the layers of tape 302 as tape 302 is wound around hub 401 at a high rate of revolutions per second. At the distal end of flanges 402 and 403, the clearance between tape 302 and flange 402 is approximately 0.028". When tape 302 is wound on reel 401, tape 302 tends to stack flush along one of flanges 402 and 403. In the example of FIG. 5, tape 302 is wound flush with side 505 of flange 403, leaving a space between tape 302 and side 504 of flange 402 of about 0.028".

Typically tape 302 winds around hub 401 such that the edges of tape 302 in each winding are aligned with the edges of tape 302 in the other windings. Occasionally, however, a winding of tape 302, or a group of windings of tape 302, extend beyond the rest of the stack of tape 302 wound on hub 401. This occurrence is represented in FIG. 5 by stagger wrap fin 501. Stagger wrap fin 501 is comprised of several windings of tape 302 around hub 401 which are not aligned with the rest of the windings of tape 302. The condition described with respect to FIG. 4, when a physical shock causes a decrease in the distance between flanges 402 and 403, results in flange 402, in the example of FIG. 5, contacting stagger wrap fin 501. Contact between flange 402 and stagger wrap fin 501 causes a crease 502 to be formed in tape 302. Crease 502 is a deformation in tape 302, such as that depicted as section 200 of tape 302 in FIG. 2. The operational problems discussed with respect to FIG. 2 are the result of crease 502 being formed in tape 302 as described with respect to FIG. 5.

Description of the Present Invention

Figure 6:
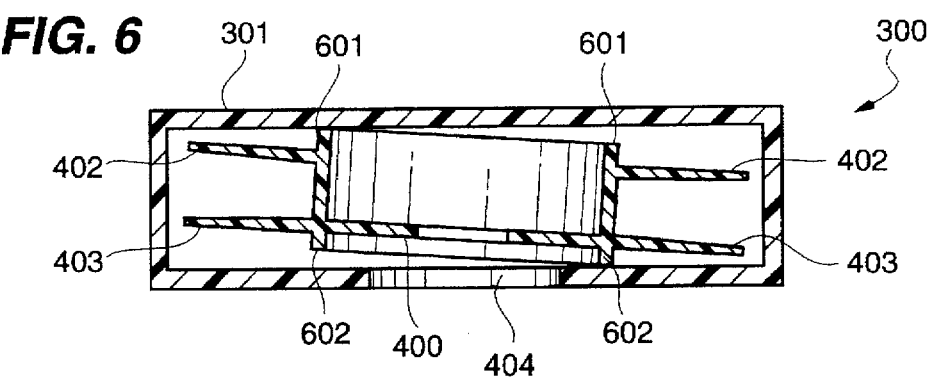
FIG. 6 shows a schematic view of a first embodiment of a reel and tape cartridge of the present invention.

FIG. 6 shows a schematic view of a tape cartridge 300 according to the present invention. Hub 401 is extended with annular-shaped protective rings 601 and 602 which are positioned and sized in order to prevent flanges 402 and 403 from ever contacting shell 301, even when shell 301 is subject to physical shock. Rings 601 and 602 may be formed as one piece with reel 401 or may be separate pieces which are fixedly attached to reel 401. As is depicted in FIG. 6, even when reel 401 moves, with respect to shell 301, to the full extent possible within shell 301, flanges 402 and 403 do not contact shell 301. In the example of FIG. 6, protective ring 601 and protective ring 602 each extend from hub 401 approximately 0.045". This configuration still allows reel 401 to move within shell 301 to the extent necessary for reel 401 to be engaged by the drive motor through drive motor port 404. It is apparent to those skilled in the art that the clearances between protective rings 601 and 602 and shell 301 can be varied to suit particular applications.

When tape cartridge 300 is dropped thereby subjecting shell 301 to physical shock, flanges 402 and 403 are not affected. This is because the only point of contact between shell 301 and reel 400 is through protective rings 601 and 602 of reel 400. Any force transmitted to reel 400 is transmitted to hub 401 through protective rings 60 and 602. Flanges 402 and 403 are therefore not forced together as in the prior art and stagger wrap fins 501, as shown in FIG. 5, are not impacted and creased by flanges 402 and 403.

Figure 7:
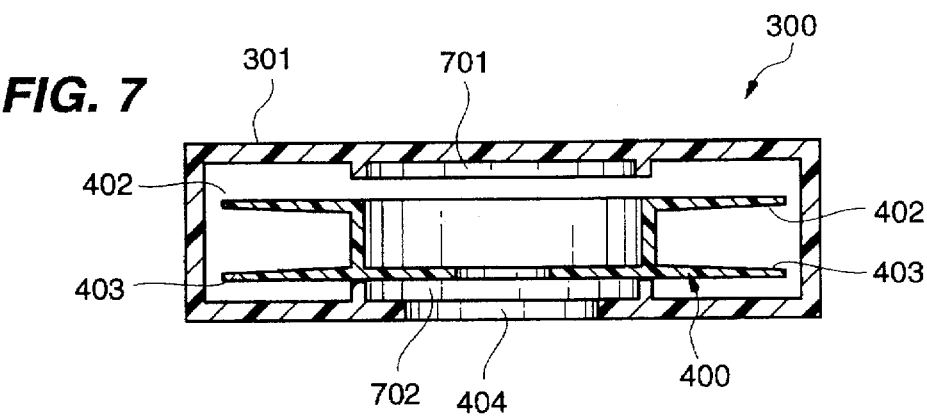
FIG. 7 shows a schematic view of a second embodiment of a reel and tape cartridge of the present invention.

FIG. 7 shows a further embodiment of the present invention. In the embodiment of FIG. 7, shell 301 is modified rather than reel 401. Reel 401 is shown in FIG. 7 resting on protective ring 702 rather than at an angle as in FIG. 6. Protective rings 701 and 702 have been added to shell 301. Rings 701 and 702 may be formed as one piece with shell 301 or may be separate pieces which are fixedly attached to shell 301. As in the embodiment of FIG. 6, protective rings 701 and 702 define a minimum tolerance between hub 401 and shell 301 as well as between flanges 402 and 403 and shell 301. When shell 301 is subjected to physical shock, flanges 402 and 403 are not affected since hub 401 is the only point of contact between reel 401 and protective rings 701 and 702 of shell 301.

It is to be expressly understood that the claimed invention is not to be limited to the description of the preferred embodiment but encompasses other modifications and alterations within the scope and spirit of the inventive concept.

We claim:

1. A tape cartridge containing magnetic tape for use in a tape drive, comprising:

a cartridge shell;

a hub having first and second ends rotatably contained within said shell for receiving said magnetic tape, wherein said hub is not attached to said shell;

a pair of flanges extending radially from said hub and arranged to contain said magnetic tape as said magnetic tape is wound around said hub wherein said pair of flanges is comprised of a first flange connected to said hub near said first end of said hub and a second flange connected to said hub near said second end of said hub;

first protective means located substantially near said first end of said hub for preventing contact between said cartridge shell and said first flange when said cartridge shell is subjected to physical shock; and second protective means located substantially near said second end of said hub for preventing contact between said cartridge shell and said second flange when said cartridge shell is subjected to physical shock.

2. The apparatus of claim 1 wherein said first and second protective means each comprises:

an annular ring formed on said hub such that said annular ring extend beyond a position on said hub where said flanges extend from said hub, said annular rings positioned to contact said cartridge shell when said cartridge shell is subjected to physical shock.

3. The apparatus of claim 1 wherein said first and second protective means each comprises:

an annular ring formed on said shell such that said annular ring extends from said shell towards said hub, said annular rings positioned to contact said hub when said cartridge shell is subjected to physical shock.

4. The apparatus of claim 1 wherein said first protective means is attached to said first end of said hub and said second protective means is attached to said second end of said hub.

5. The apparatus of claim 1 wherein said first protective means is attached to said first end of said hub and said second protective means is attached to said shell at a position proximate to said second end of said hub.

6. The apparatus of claim 1 wherein said first and second protective means are formed to substantially match the diameter of said hub.

* * * * *